(12) United States Patent  (10) Patent No.: US 8,305,008 B2
Yang  (45) Date of Patent: Nov. 6, 2012

(54) CONSTANT-CURRENT CONTROLLER FOR LED LIGHT STRING

(76) Inventor: Chen-Sheng Yang, Kaohsiung (TW)

( * ) Notice: Subject to any disclaimer, the term of this patent is extended or adjusted under 35 U.S.C. 154(b) by 394 days.

(21) Appl. No.: 12/782,740

(22) Filed: May 19, 2010

(65) Prior Publication Data

US 2011/0285300 A1    Nov. 24, 2011

(51) Int. Cl.
*G05F 1/00* (2006.01)
*H05B 37/02* (2006.01)
*H05B 39/04* (2006.01)
*H05B 41/36* (2006.01)
*H05B 37/00* (2006.01)
*H05B 39/00* (2006.01)
*H05B 41/00* (2006.01)

(52) U.S. Cl. ......... 315/291; 315/297; 315/307; 315/312

(58) Field of Classification Search ................ 315/185 S
See application file for complete search history.

(56) References Cited

U.S. PATENT DOCUMENTS 8,120,288 B2 * 2/2012 Liu et al. ....................... 315/320

* cited by examiner

*Primary Examiner* — Douglas W Owens
*Assistant Examiner* — Dedei K Hammond
(74) *Attorney, Agent, or Firm* — Alan Kamrath; Kamrath IP Lawfirm, PA

(57) ABSTRACT

A constant-current controller for a LED light string has a control unit, multiple constant current circuits, multiple first switches and multiple second switches. The control unit outputs driving signals to turn on the first switches, causing the second switches being turned on subsequently. Therefore, the constant current circuits output electric currents flowing through the second switches to activate the LED light string.

3 Claims, 2 Drawing Sheets

CONSTANT-CURRENT CONTROLLER FOR LED LIGHT STRING

BACKGROUND OF THE INVENTION

1. Field of the Invention

The present invention relates to a constant-current controller, especially to a constant-current controller that generates a stable current for driving a LED light string.

2. Description of the Related Art

With reference to FIG. 2, a control box (60) is connected to a LED light string (62) through a resistor assembly (64) and drives the LED light string (62) according to the pre-determined control program. The LED light string (62) may have lighting units connected in parallel and each lighting unit is further composed of multiple LEDs.

The resistor assembly (64) includes multiple resistors (641) respectively corresponding to the lighting units. Each resistor (641) should be selected properly to have a resistance matching the forward voltage (Vf) of the LEDs. However, the resistor assembly (64) is not integrated in the control box (60), but as a separate device mounted between the control box (60) and the light string (62). When the control box (60) operates, the resistor assembly (64) is not safe because it often heats to a high temperature and eventually burns down. In addition to the safety concern, the separate resistor assembly (64) also causes the aesthetic problems.

With further reference to FIG. 3, the light string (62) may comprise multiple lighting units (621) and each lighting unit (621) is connected with a separate a transistor (T1)(T2). When the transistors (T1)(T2) are turned on, the lighting units (621) are activated by driving currents and emit light. However, such a circuit configuration has to use many wires for connecting the lighting units (621) respectively to a ground.

To overcome the shortcomings, the present invention provides constant-current controller for a LED light string to mitigate or obviate the aforementioned problems.

SUMMARY OF THE INVENTION

The main objective of the invention is to provide a constant-current controller that generates stable currents to activate multiple LEDs of a LED light string without using an additional resistor assembly.

To achieve the objective, the constant-current controller has an operating voltage generating circuit for converting an AC voltage to an operating voltage; a control unit connected to the operating unit to receive the operating voltage, storing a control program and having multiple output terminals; multiple constant current circuits connected respectively between the AC voltage and multiple second switches, and converting the AC voltage to a DC voltage; the multiple second switches adapted to connect to the lighting units of the LED light string respectively; and multiple first switches respectively connected to the output terminals of the control unit and the second switches.

The control unit outputs driving signals based on the control program to turn on the first switches, which resulting in activation of the second switches. Therefore, electric currents from the constant current circuits flow through the second switches and activate the lighting units of the LED light string.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
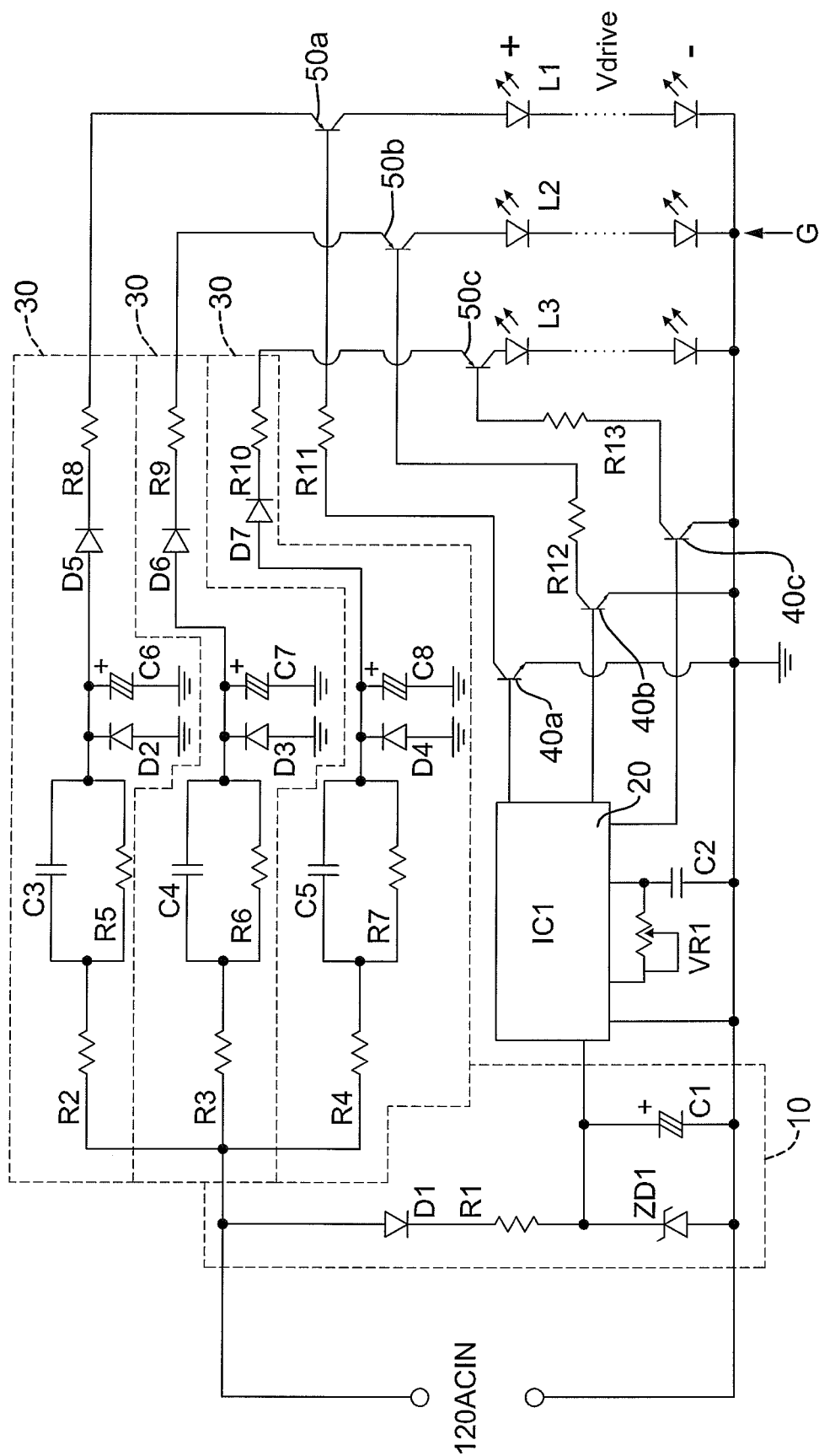
FIG. 1 is circuit diagram of a constant-current controller for a LED light string in accordance with the present invention.
Figure 2:
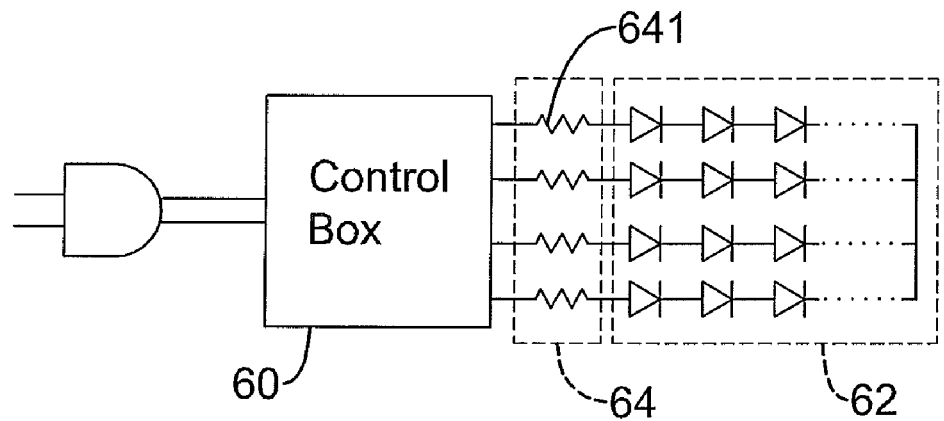
FIG. 2 is a block diagram of a conventional control circuit for a LED light string.
Figure 3:
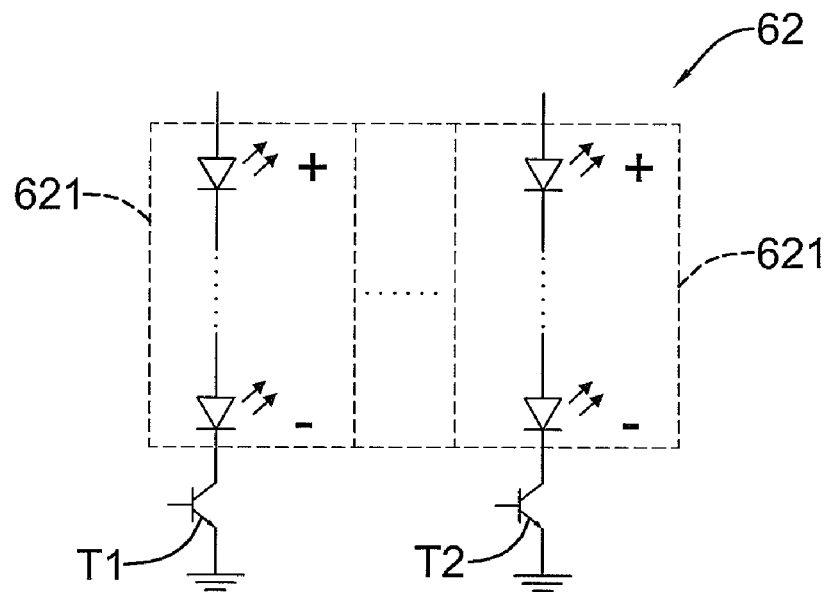
FIG. 3 is a partial circuit diagram of a conventional control circuit for a LED light string.

With reference to FIG. 1, a constant-current controller for a LED light string in accordance with the present invention comprises an operating voltage generating circuit (10), a control unit (20), multiple constant current circuits (30), multiple first switches (40a)-(40c) and multiple second switches (50a)-(50c). The LED light string may include multiple lighting units (L1)-(L3) and each unit (L1)-(L3) is composed of multiple LEDs connected in series.

The operating voltage generating circuit (10) converts an AC voltage to an operating voltage input to the control unit (20).

The control unit (20) stores a control program and has multiple output terminals for respectively connecting with the first switches (40a)-(40c). The control unit (20) outputs driving signals from the output terminals to turn on the corresponding first switches (40a)-(40c) according to the control program.

Each of the constant current circuits (30) is connected between the AC voltage and a corresponding second switch (50a)-(50c) and converts the AC voltage to a DC voltage for a respective lighting unit (L1)-(L3). Each of the constant current circuits (30) comprises a first resistor (R2)-(R4), a first capacitor (C3)-(C5), a second resistor (R5)-(R7), a first diode (D2)-(D4), a second capacitor (C6)-(C8), a second diode (D5)-(D7) and a current limiting resistor (R8)-(R10).

The first resistor (R2)-(R4) is connected to the AC voltage. The first capacitor (C3)-(C5) and the second resistor (R5)-(R7) are connected in parallel and further connected to the first resistor (R2)-(R4), the second diode (D5)-(D7) and the current limiting resistor (R8)-(R10). The first diode (D2)-(D4) and the second capacitor (C6)-(C8) are connected in parallel between an anode of the second diode (D5)-(D7) and a ground. In the moment that the AC voltage is suddenly applied to the constant-current controller, the capacitors (C3) (C6) and the diode (D2) cause a large inrush current. Therefore, each current limiting resistor (R8)-(R10) provides an over-current protection and keeps the lighting unit (L1)-(L3) from damaging.

Each of the first switches (40a)-(40c) is a NPN transistor having a base, an emitter and a collector. The base is connected to a respective output terminal of the control unit (20), the emitter is connected to the ground and the collector is connected to a corresponding second switch (40a)-(40c) through a third resistor (R11)-(R13).

Each of the second switches (50a)-(50c) is a PNP transistor having a base, an emitter and a collector. The base of the second switch (50a)-(50c) is connected to the third resistor (R11)-(R13). The collector of the second switch (50a)-(50c) is connected to a corresponding lighting unit (L1)-(L3). The emitter of the second switch (50a)-(50c) is connected to the current liming resistor (R8)-(R10) of a corresponding constant current circuit (30).

As the control unit (20) outputs the driving signals to turn on the first switches (40a)-(40c), the second switches (50a)-

($50c$) are subsequently turned on to provide current paths for the lighting units (L1)-(L3), whereby electric currents from the constant current circuits (30) flow through the turned-on second switches ($50a$)-($50c$) to activate the lighting units (L1)-(L3).

By properly determining the capacitance of the first capacitor (C3)-(C5), each constant current circuit (30) of the present invention provides a suitable driving voltage ($V_{drive}$) for a corresponding lighting unit (L1)-(L3). The driving voltage ($V_{drive}$) is able to turn on all LEDs in the lighting unit (L1)-(L3). Therefore, the safety and aesthetic problems resulted from the separate resistor assembly can be avoided. Furthermore, since all the lighting units (L1)-(L3) are connected to the same ground (G) via the same wire, the number of wires that connect the lighting units (L1)-(L3) to the ground (G) are reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A constant-current controller for a LED light string having multiple lighting units, the constant-current controller comprising:
    an operating voltage generating circuit for converting an AC voltage to an operating voltage;
    a control unit connected to the operating unit to receive the operating voltage, storing a control program and having multiple output terminals;
    multiple constant current circuits connected respectively between the AC voltage and multiple second switches, and converting the AC voltage to a DC voltage;
    the multiple second switches adapted to connect to the lighting units of the LED light string respectively;
    multiple first switches respectively connected to the output terminals of the control unit and the second switches;
    the control unit outputting driving signals according to the control program to turn on the first switches, and the second switches being subsequently turned on to allow electric currents from the constant current circuits to flow through the second switches thus activating the lighting units of the LED light string.

2. The constant-current controller as claimed in claim 1, wherein
    each of the first switches is a NPN transistor having a base, an emitter and a collector, the base is connected to a corresponding output terminal of the control unit, the emitter is connected to a ground, and the collector is connected to a corresponding second switch through a third resistor; and
    each of the second switches is a PNP transistor having a base, an emitter and a collector, the base is connected the third resistor, the emitter is connected to a corresponding constant current circuit and the collector is connected to a corresponding lighting unit of the LED light string.

3. The constant-current controller as claimed in claim 2, wherein
    each of the constant current circuits comprises a first resistor, a first capacitor, a second resistor, a first diode, a second capacitor, a second diode and a current limiting resistor;
    the first resistor is connected to the AC voltage;
    the first capacitor and the second resistor are connected in parallel and further connected in series to the first resistor, the second diode and the current limiting resistor;
    the first diode is connected between an anode of the second diode and the ground; and
    the second capacitor is connected between the anode of the second diode and the ground.

* * * * *